(12) United States Patent
Curtis et al.

(10) Patent No.: US 6,317,588 B1
(45) Date of Patent: *Nov. 13, 2001

(54) LCD SUPPORT FRAME

(75) Inventors: Alastair Stuart Curtis, Woodland Hills, CA (US); Kwok Keung Chan, New Territories (HK)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,651

(22) Filed: Jan. 24, 1997

(30) Foreign Application Priority Data

Feb. 6, 1996 (GB) .................................. 9602376

(51) Int. Cl.[7] .............................. H04B 1/38; H04B 1/08; H04M 1/00
(52) U.S. Cl. ........................ 455/90; 455/575; 455/348; 455/349; 455/566; 379/433; 379/429
(58) Field of Search ...................... 455/566, 550, 455/90, 575, 347, 348, 349; 379/428, 429, 433, 437, 368, 369, 370, 419; 361/814, 679, 680, 681, 682, 829, 729; 312/7.1; 439/67, 76, 136; 257/723

(56) References Cited

U.S. PATENT DOCUMENTS

| | | | |
|---|---|---|---|
| 4,719,322 | * 1/1988 | Guzik et al. | 455/575 |
| 4,945,633 | 8/1990 | Hakanen et al. | 29/825 |
| 5,036,432 | 7/1991 | Uronen et al. | 361/422 |
| 5,045,973 | 9/1991 | Saarela et al. | 361/395 |
| 5,218,188 | * 6/1993 | Hanson | 455/575 |
| 5,235,636 | 8/1993 | Takagi et al. | 379/368 |
| 5,241,695 | * 8/1993 | Roshitsh et al. | 455/349 |
| 5,271,056 | 12/1993 | Pesola et al. | 379/58 |
| 5,357,065 | * 10/1994 | Mitamura et al. | 361/729 X |
| 5,561,437 | * 10/1996 | Phillips et al. | 455/575 |
| 5,603,104 | * 2/1997 | Phelps, III et al. | 455/90 |
| 5,703,932 | * 12/1997 | Oda | 379/368 |
| 5,703,947 | * 12/1997 | Hlno et al. | 379/419 |
| 5,819,163 | * 10/1998 | Tsukamoto et al. | 455/348 |
| 6,025,644 | * 2/2000 | Imaeda | 257/723 |
| 6,041,120 | * 3/2000 | Olkkola | 379/433 |
| 6,126,454 | * 10/2000 | Flegeo | 439/67 |
| 6,226,535 | * 5/2001 | Sun | 455/566 |
| 6,229,994 | * 5/2001 | Pavert | 455/90 |

FOREIGN PATENT DOCUMENTS

0656692 A2   6/1995 (EP) .
2 285 195    6/1995 (GB) .

* cited by examiner

Primary Examiner—Tracy Legree
(74) Attorney, Agent, or Firm—Perman & Green, LLP

(57) ABSTRACT

An improved LCD display module for use in a radio telephone has integrated side keys which simplify the assembly of the telephone and provide other advantages.

6 Claims, 4 Drawing Sheets

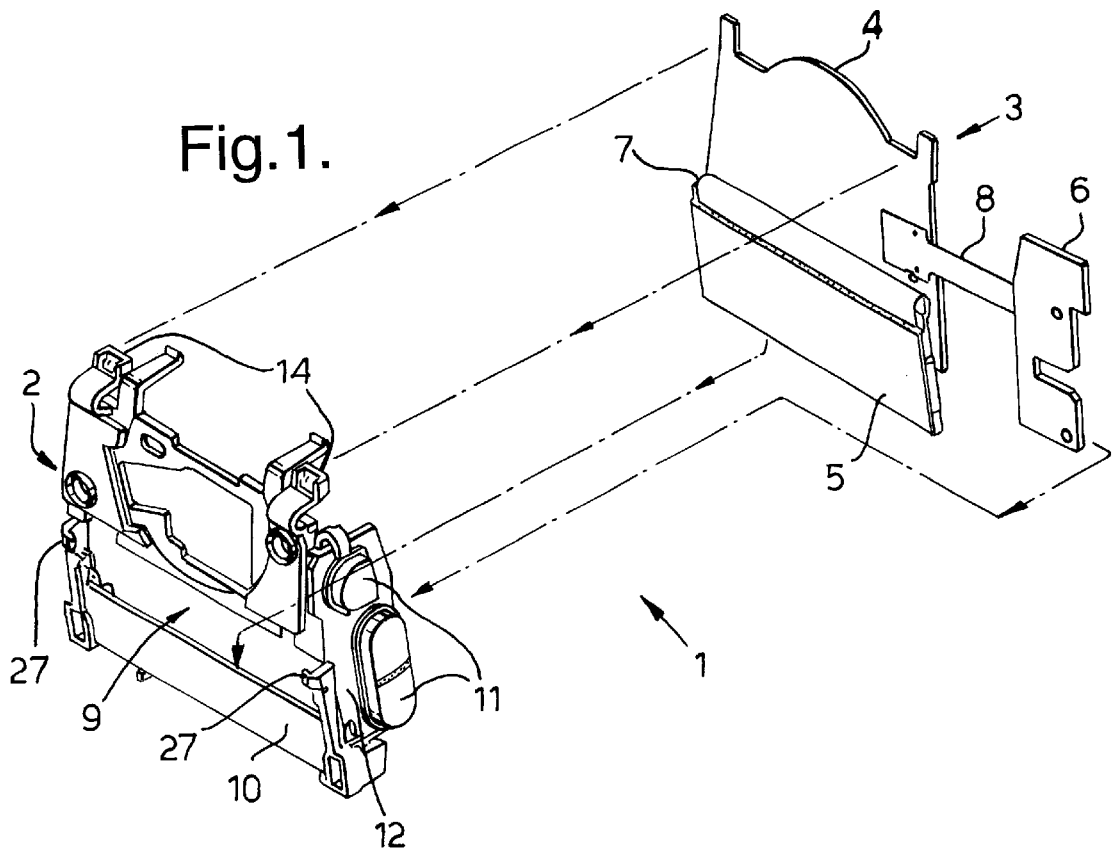
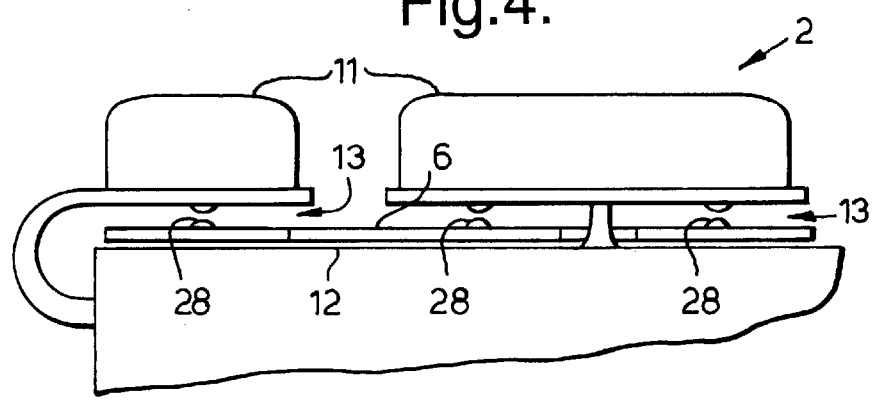
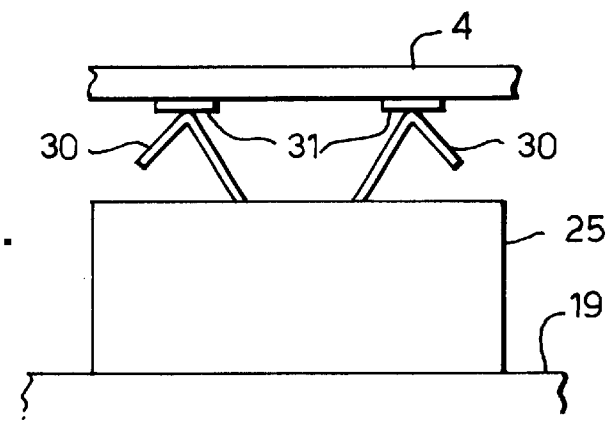

LCD SUPPORT FRAME

BACKGROUND OF THE INVENTION

This invention relates to liquid crystal displays (LCD's) suitable for use in radio telephones.

Liquid crystal displays used in radio telephones are frequently located on dedicated LCD modules separate from the main printed circuit board (PCB) of the telephone. There exist a number of advantages in having this kind of arrangement. The first advantage in most cases is to save space. Main PCB's used in radio telephones are often packed with electrical components so densely that there is little room left for the relatively large components such as the display. By providing the LCD display on a dedicated module which is located above the main PCB the overall area of the main PCB may be reduced.

Another reason for including the LCD module separately from the main PCB is to permit a variety of mechanical layouts to be realised. If the LCD display needs to be raised from the main PCB in order for it to be closer to the front cover or if the LCD display needs to be angled in any way then a separate module provides for such arrangements in a more flexible way.

Perhaps the most important advantage of providing the LCD display on a separate module is to enable simpler assembly of the radio telephone. The advanced LCD modules which are becoming increasingly popular in radio telephones generally have low tolerances and do not integrate well in the standard production line techniques used to produce the main PCB's in radio telephones. For example, heat bonding techniques used to provide electrical connections to an LCD display would damage standard electronic components on a PCB. Therefore, to increase the overall rate of production of the radio telephone it is advantageous to produce the main PCB on one production line and to produce separate dedicated LCD modules on another production line. In this way the main PCB and the LCD module can be assembled together more simply towards the end of the production cycle thus saving in the overall time of production.

In one type of known radio telephone the liquid crystal display (LCD) module comprises a plastic frame designed to be clipped onto the main PCB of the radio telephone. The main PCB may be designed to include locating holes and suitable mounting locations for the LCD module. The LCD module may also comprise an LCD display and an LCD driver PCB, both of which may be mounted on the plastic frame by adhesive tape. The LCD driver PCB may be connected to the main PCB using a standard ribbon cable which plugs into a ribbon cable socket on the main PCB. It is also possible to include key contacts on the LCD module connected via another ribbon cable to the LCD driver PCB. These key contacts when operated by suitable keys act as side keys for the telephone in addition to keys provided by the main keypad. An alternative way of providing side keys for a radio telephone could be to attach a side key module to the main PCB of the radio telephone.

In practice these LCD modules tend to be problematic and do not provide adequately all the advantages referred to. Known LCD modules tend to impede the automated production cycle of a radio telephone by requiring labour intensive installation onto the main PCB. At the assembly stage on the main production line the ribbon cable of the LCD driver PCB must be placed manually into the ribbon cable connector of the main PCB. Likewise the addition of the optional side keys also increases the number of steps of the assembly stage on the main production line.

In known LCD modules the key contacts are positioned on the side of the support frame of the LCD module before the keys which operate them are introduced. When the keys are finally assembled in place above the key contacts there is an additional step in the production line to ensure the keys and the key contacts are aligned correctly. As the keys are usually added at the final stage of production when the cover of the telephone is fixed in place, the risk of misalignment of the keys and the key contacts is high. At the post production stage there still exists a problem of reliability. The keys are often placed loosely over the key contacts or are mounted on the cover of the telephone. As such the keys and the key contacts can easily misalign through normal use of the side keys resulting in their faulty operation.

SUMMARY OF THE INVENTION

According to a first aspect of the present invention there is provided a support frame for a display module of a radio telephone, adapted to receive a display and a key operable contact, wherein the support frame includes a key suitable for operating the key operable contact.

According to a second aspect of the present invention there is provided a display module for use in a radio telephone, comprising the support frame according to the first aspect of the present invention, a key operable contact, and a display.

A support frame and display module in accordance with the present invention has the advantage that they provide the basis for an LCD module with integrated side keys. This results in simplification of the assembly stage in the manufacture of a radio telephone incorporating a display module in accordance with the present invention. The integration of the side keys in the support frame allows the display module to be mounted onto the main PCB without further mounting of separate side keys. As there is no requirement for separate side keys, the component count on the production line is reduced. This in turn allows for an increased rate of production of the radio telephone by removing from the assembly stage the step of mounting and aligning separate side keys. In accordance with the invention, side keys may be integrated onto a support frame of a display module, allowing the relative positions of the side keys and the key contacts below to be determined precisely during the production of the display module, so providing accurate alignment of the keys and the key contacts. This kind of arrangement also facilitates a sturdier alignment of the keys and the key contacts thus ensuring increased reliability of the keys during the life of the radio telephone.

Preferably the support frame including the key is formed from a single moulding. The single moulding allows the support frame to be made in large quantities, inexpensively and at a high rate thus increasing the rate and reducing cost of production of a display module. An additional advantage of the single moulding is that when different styles of side key are required it is possible to simply modify the design moulding of the LCD module to alter the graphics on the side keys. This would require only minimal changes to be made to the assembly stage of the radio telephone production line.

Ideally the display module further comprises a display circuit board which is connected to the display and the key operable contact. The display circuit board may contain an LCD display driver for driving an LCD display. The circuit board also has the advantage of providing a suitable base to connect the display module to other components of the radio telephone such as the main PCB.

Suitably the display module is adapted to electrically connect to the main circuit board via a spring contact. The display module may be provided with contacts suitable for use with a contact connector such as a stacker connector. This type of connector when mounted on one component operates using spring contacts to electrically couple to contacts on another component when the two components are pushed together. By applying this principle advantageously the display module can be electrically connected to the radio telephone's main PCB having the stacker connector by simply clipping the display module in place over the main PCB using automated placement machinery. This improves over the prior art method of connecting via a ribbon cable which requires manual connection resulting in a prolonged assembly time and associated labour costs.

Preferably the loudspeaker connection of the radio telephone is also provided on the display module. An advantage of having the loudspeaker connection on the display module is that it alleviates the problems associated with the RF shielding. When RF shielding is placed above the main PCB of a radio telephone, elaborate arrangements usually have to be made to connect the loudspeaker above the RF shield to the loudspeaker contacts on the main PCB below the RF shield. By having the loudspeaker contacts on the LCD module above the shield there is no need for the separate elaborate arrangements for the loudspeaker connection. The existing connection from the LCD module to the main PCB may be used instead to couple the loudspeaker to the main PCB.

Another advantage of having the loudspeaker contacts on the display module is that the larger area available on the display module compared to the main PCB means that the size of the loudspeaker contacts may be made large enough to enable the loudspeaker to couple to the display module using spring contacts. If similar spring contacts were used by the loudspeaker when coupling to the main PCB then much of the valuable space on the main PCB would be used up. This method of coupling the loudspeaker to the main PCB also allows the front cover of the phone to be supplied with the loudspeaker already fitted so that assembly of the loudspeaker occurs concurrently with the attachment of the front cover to the main PCB of the radio telephone thus saving production time.

Preferably the display of the display module is in the form of an LCD display which in accordance with the invention is incorporated into a radio telephone.

Ideally the display module rests above a metal shielding plate which prevents influx and emission of electromagnetic radiation respectively to and from components on the main PCB.

BRIEF DESCRIPTION OF THE DRAWINGS

Embodiments of the invention will now be described, by way of example, with reference to the accompanying drawings, in which:

FIG. 1 is a exploded perspective view of a support frame and a display PCB of an LCD module in accordance with the invention;

FIG. 4 is a partial side view of the support frame of FIG. 1 showing in detail the side keys;

FIG. 5 is a side view of a stacking connector connected to contacts of the LCD module of figure 1;

DETAILED DESCRIPTION OF THE INVENTION

Figure 2:
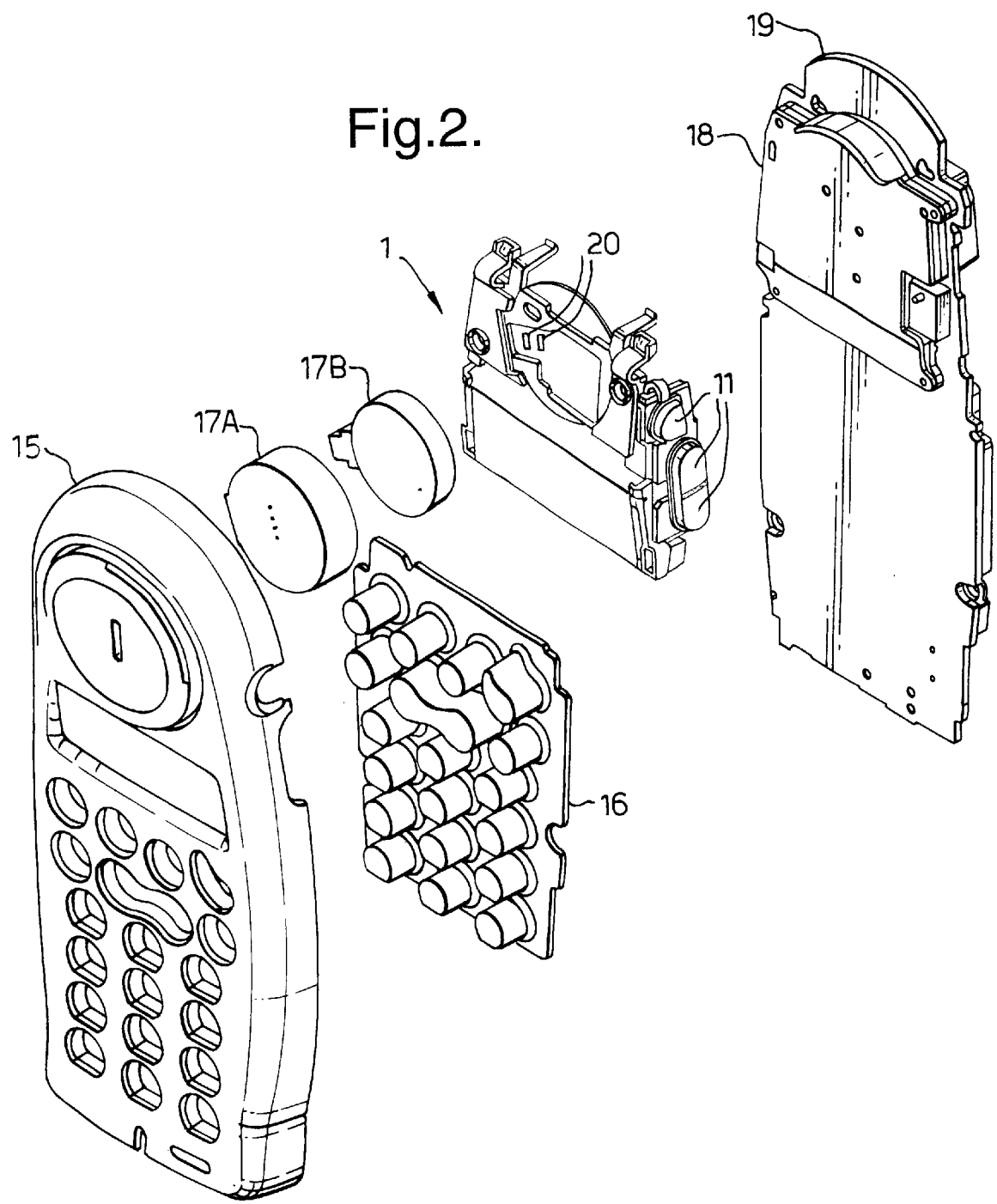
FIG. 2 is a exploded view of a radio telephone including the LCD module of FIG. 1, a main PCB, and a front cover.

Referring to FIG. 1 there is shown a support frame 2 and a display PCB 3 which together form an LCD module 1 suitable for use in a radio telephone. The term LCD module refers to a display module in which the display is in the form of an LCD display.

The display PCB 3 comprises a display driver board 4, an LCD display 5, and an auxiliary board 6. The display driver board 4 has components mounted onto it which drive the LCD display 5. The LCD display 5 is itself connected to the display driver board 4 via a multi-contact flexible foil connection 7. The auxiliary board 6 is also connected to the display driver board 4 via a ribbon connector 8 and includes dome key contacts 28 (see FIG. 4).

The support frame 2 is a single moulded component made, for example, of a plastics material and is designed to receive the display PCB 3 as follows. From the initial position shown in FIG. 1 the LCD display 5 is fed through the hole 9 in the support frame 2. The LCD display is held in place using adhesive tape to attach the back surface of the LCD display 5 to the surface 10 of the support frame 2 and by using the clips 27 of the support frame 2 which clip around the front of the LCD display. The auxiliary board 6 of the display PCB 3 is rotated around the vertical axis in FIG. 1 through ninety degrees and is slidably inserted into position behind the side keys 11 of the support frame 2. Referring also to FIG. 4, the auxiliary board 6 is held in place on the surface 12 behind the keys with adhesive tape. The auxiliary board 6 is sandwiched in this position in the space 13 between the main structure of the support frame 2 and the keys 11. The key contacts 28 of the auxiliary board 6 and the keys 11 on the support frame 2 are correctly aligned so that depression of the keys 11 activates the key contacts of the auxiliary board. The dependency of the keys 11 and the auxiliary board 6 to the support frame 2 results in a precise and reliable construction of side keys being formed. The display driver board 4 of the display PCB 3 once received by the support frame 2 locates on the opposite side of the support frame 2 from the LCD display 5 and is held in place by clips 14 on the support frame 2.

Figure 3:
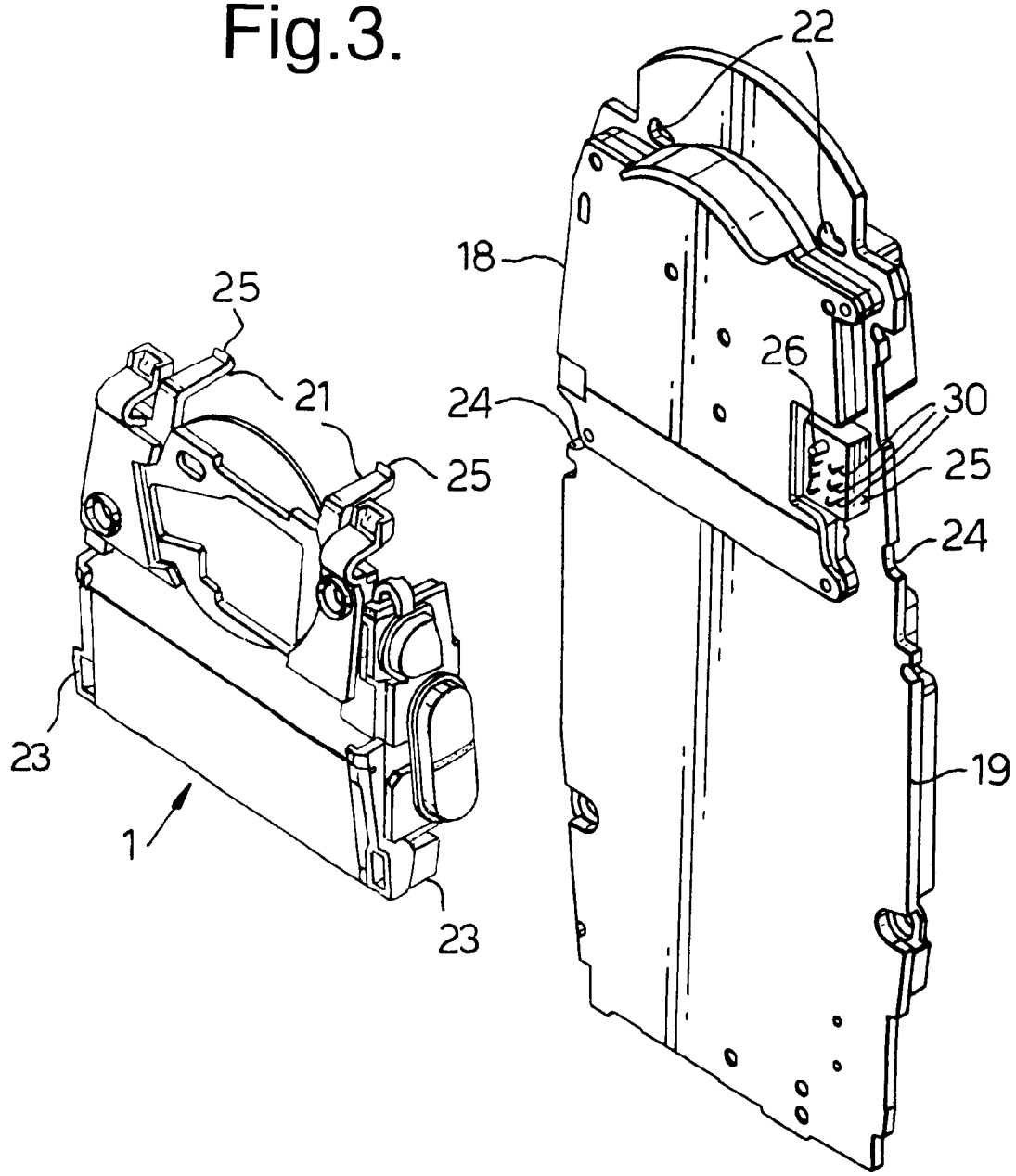
FIG. 3 is an enlarged view of the LCD module and the main PCB of FIG. 2.

Once the display PCB 3 and support frame 2 are connected the whole structure forms a rigidly assembled LCD module 1 as shown in FIG. 3.

Figure 6:
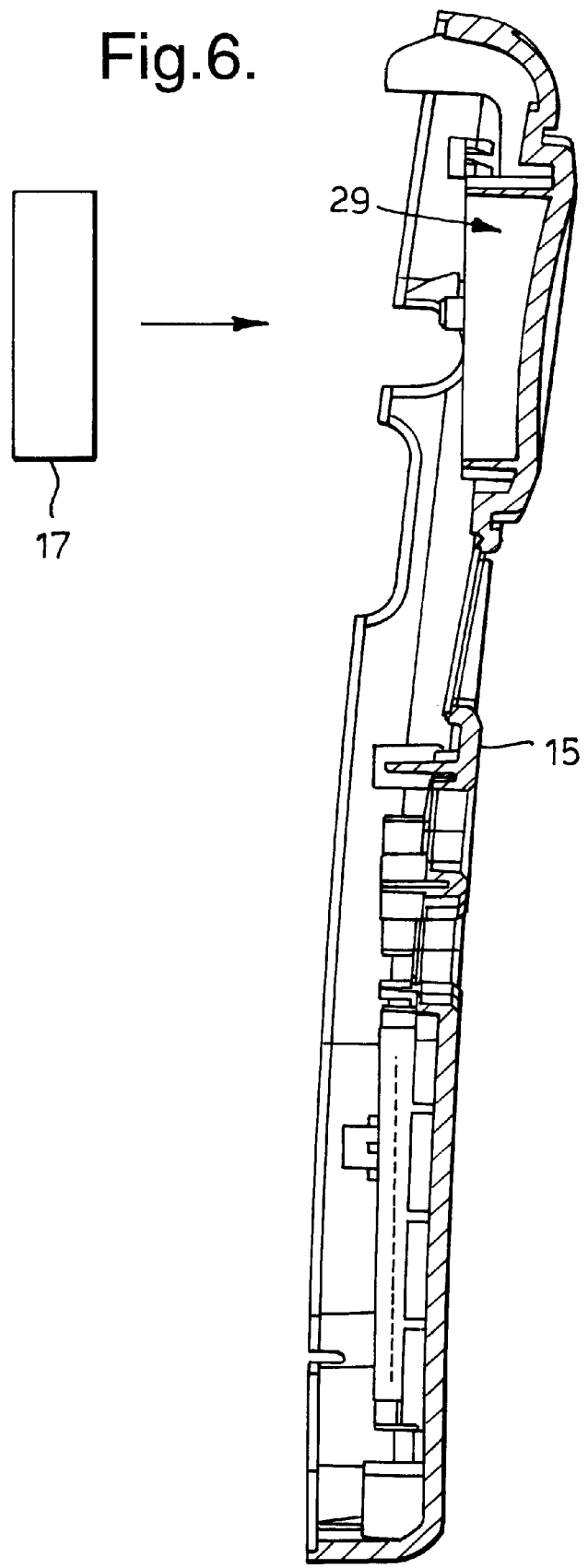
FIG. 6 is a side cross-sectional view of a front cover of a radio telephone and a loudspeaker suitable for insertion therein.

Referring now to FIG. 2, there is shown an exploded view of a substantial part of a radio telephone comprising a front cover 15, a keymat 16, a loudspeaker 17A and 17B, an assembled LCD module 1, an RF shield 18, and a main PCB 19. Beginning with the main PCB 19 the radio telephone is assembled as follows. The RF shield is placed over RF components on the main PCB 19 and the keymat 16 is placed over the keyboard section of the main PCB 19 below the RF components. The assembled LCD module 1 is then placed over the RF shield 18 and clipped onto the main PCB 19 beneath as described later in further detail. The loudspeaker comprising the housing 17A and the transducer 17B are assembled and positioned in an alcove 29 in the front cover 15 as shown in FIG. 6. The front cover 15 including the loudspeaker 17A and 17B is then located as a single unit over the keymat 16 and LCD module 1 to complete the assembly. Spring contacts are provided on the transducer 17B which in the assembled state engage loudspeaker contacts 20 on the LCD module 1. In a fully assembled radio telephone which includes a back cover (not shown), the keys 11 of the LCD module 1 protrude through openings on the side of the front cover 15 to enable operation by a user of the telephone.

FIG. 3 shows a enlarged view of the main PCB 19, the LCD module 1, and the RF shield 18 in place on the main PCB 19. Connection of the LCD module 1 to the main PCB 19 is achieved by first inserting the clips 21 of the support frame of the LCD module 1 through the holes 22 in the main PCB 19. The second set of clips 23 on the support frame of the LCD module 1 are then clipped around the edges of the main PCB 19 at suitable location indents 24. The flanges 25 on the end of the clips 21 prevent the clips 21 from retracting out of the holes during attachment of the second set of clips 23. This attachment procedure may be performed by an automated placement machine. Electrical connection between the LCD module 1 and the main PCB 19 is achieved via a stacking connector 25 mounted on the main PCB 19. The stacking connector 25 includes a plurality of spring contacts 30 which are arranged to provide connection with respective complimenting contacts 31 on the LCD module 1. FIG. 5 shows a side view of a pair of spring contacts 30 of the stacking connector 25 mounted on the main PCB 19 in contact with the complimenting contacts 31 on the display driver board 4 of the LCD module 1 when the LCD module 1 and the main PCB 19 are in the assembled state. To ensure the LCD module 1 and the main PCB 19 are aligned correctly in the vicinity of the stacking connector 25 there may be provided on the stacking connector a guide pin 26. The display driver board 4 of the LCD module may then include a guide hole into which the guide pin locates to ensure the LCD module 1 and the main PCB are aligned correctly. This ensures the spring contacts 30 of the main PCB couple with the correct complimenting contacts 31 of the LCD module.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention. The invention is also suitable for use in other electronic devices other that radio telephones such as personal organisers.

What is claimed is:

1. A display module comprising:

a support frame for mounting within an exterior housing of an electronic device;

an auxiliary printed circuit board attached to said support frame to form a rigid display module, independent of a main control circuit board for said electronic device, said auxiliary printed circuit board having a processor connected to operate said display module, said auxiliary printed circuit board having means for connecting to said main control board after assembly of said electronic device; and further said auxiliary printed circuit board having at least one key operated contact mounted thereon;

a display mounted on said auxiliary printed circuit board for providing a user interface for said electronic device; and at least one key integrally formed with said support frame, said key aligned with said contact for operable association therewith, said key being independent of a main keyboard of said electronic device.

2. A display module, according to claim 1, wherein said means for connecting to said main control board is a spring biased connector.

3. A display module, according to claim 1 wherein a speaker for said electronic device is mounted on said support frame and connected to said main circuit board through said auxiliary circuit board.

4. A radio telephone having a main printed circuit board containing the components and connections for operation of said telephone, a main keyboard providing a user interface for a user, and an exterior housing for containing the operative components of said telephone, said radio telephone further having a display module comprising:

a support frame mounted within said exterior housing;

an auxiliary printed circuit board attached to said support frame to form a rigid display module, independent of said main printed circuit board for said radio telephone, said auxiliary printed circuit board having a processor connected to operate said display module, said auxiliary printed circuit board having means for connecting to said main circuit board after assembly of said radio telephone; and further said auxiliary printed circuit board having at least one key operated contact mounted thereon;

a display mounted on said auxiliary printed circuit board for providing a user interface for said radio telephone; and at least one key integrally formed with said support frame, said key aligned with said contact for operable association therewith, said key being independent of a main keyboard of said electronic device.

5. A radio telephone having a main printed circuit board containing the components and connections for operation of said telephone, a main keyboard providing a user interface for a user, and an exterior housing for containing the operative components of said telephone, said radio telephone further having a display module comprising, according to claim 4, wherein said means for connecting to said main control board is a spring biased connector.

6. A radio telephone having a main printed circuit board containing the components and connections for operation of said telephone, a main keyboard providing a user interface for a user, and an exterior housing for containing the operative components of said telephone, said radio telephone further having a display module co according to claim 4, wherein a speaker for said radio telephone is mounted on said support frame and connected to said main circuit board through said auxiliary circuit board.

* * * * *

UNITED STATES PATENT AND TRADEMARK OFFICE
CERTIFICATE OF CORRECTION

PATENT NO. : 6,317,588 B1
DATED : November 13, 2001
INVENTOR(S) : Alastair Stuart Curtis and Kwok Keung Chan It is certified that error appears in the above-identified patent and that said Letters Patent is hereby corrected as shown below:

<u>Column 6,</u>
Line 54, "co" should read -- comprising --.

Signed and Sealed this

Twenty-first Day of May, 2002

Attest:

Attesting Officer

JAMES E. ROGAN
Director of the United States Patent and Trademark Office